(12) United States Patent
Bonham

(10) Patent No.: US 6,863,294 B1
(45) Date of Patent: Mar. 8, 2005

(54) EASY ALIGNMENT TRAILER HITCH

(76) Inventor: Brent Bonham, 9552 Ksel Dr., Sandy, UT (US) 84092

( * ) Notice: Subject to any disclaimer, the term of this patent is extended or adjusted under 35 U.S.C. 154(b) by 0 days.

(21) Appl. No.: 10/764,875

(22) Filed: Jan. 27, 2004

(51) Int. Cl.[7] .................................................. B60D 1/40
(52) U.S. Cl. .................................. 280/479.2; 280/491.5
(58) Field of Search .......................... 280/491.5, 478.1, 280/479.2, 479.3

(56) References Cited

U.S. PATENT DOCUMENTS

| | | | | |
|---|---|---|---|---|
| 2,856,204 A | * | 10/1958 | Graham ................... | 280/491.2 |
| 3,437,355 A | * | 4/1969 | Jeffes ...................... | 280/479.3 |
| 3,503,627 A | * | 3/1970 | Lowry et al. ............. | 280/491.5 |
| 3,860,267 A | * | 1/1975 | Lyons ..................... | 280/479.3 |
| 4,176,854 A | * | 12/1979 | Hill et al. ................ | 280/478.1 |
| 5,322,315 A | * | 6/1994 | Carsten ................... | 280/479.2 |
| 5,630,606 A | * | 5/1997 | Ryan ....................... | 280/479.3 |

* cited by examiner

*Primary Examiner*—Kevin Hurley

(57) ABSTRACT

An easy alignment trailer hitch comprising a conventional hitch insert to be attached to a towing vehicle and aligned holes through sidewalls thereof; an insert assembly having spaced apart slide plates connected at one end to an end plate to be inserted into the bore of the receiver, a slide block between the slide plates is attached to the receiver and means for releasably locking the slide plates to the slide block when the insert assembly is fully inserted into the receiver.

9 Claims, 5 Drawing Sheets

EASY ALIGNMENT TRAILER HITCH

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to trailer hitches.

2. Description of the Related Art

A very common tow system for a vehicle, towing a trailer, includes a trailer with a tongue and a socket on the end of the tongue that is adapted to fit over a ball that is carried by a hitch assembly. Commonly, the hitch assembly includes a receiver that is permanently attached to a towing vehicle and a tow bar that will telescope into the receiver and be held by a locking pin. The tow bar has a ball support plate affixed to the other end and the ball support plate has a hole through which the stem of the ball is inserted and secured.

In connecting the towed trailer to the towing vehicle it is generally necessary to pull the trailer close enough to the vehicle to allow the socket to fit over the ball. Alternatively, the vehicle is backed to position the ball beneath the socket. In either case, the tongue end of the trailer must be raised to allow clearance of the ball beneath the socket. Particularly, if the trailer is heavy or is carrying a heavy load, it is necessary that the tow vehicle be backed into position placing the ball beneath the socket on the tongue of the trailer. The socket on the trailer tongue is then lowered onto the ball. However, backing of the tow vehicle to properly align the ball to be beneath the socket is sometimes a very difficult maneuver. This is particularly true if the tow vehicle is large and does not allow the driver to have a clear view of the back of the vehicle. Thus, motor homes, pick-up trucks with campers on the back thereof and large trucks are difficult for a driver to properly align with the socket. It is not unusual that a driver will need an assistant directing the backup operation, or the driver may have to get in and out of the vehicle a number of times to be sure that the ball is coming into proper alignment with the socket of the trailer.

OBJECTS OF THE INVENTION

It is a principal object of the present invention to provide a hitch assembly that will allow a driver more easily to back a tow vehicle having a ball secured to the back of the tow vehicle such that the ball is directly beneath, or is somewhat off alignment, with the socket of a trailer so that the socket can be secured to the ball.

Additional objects are to provide an easy alignment trailer hitch, including components compatible with the usual receiver mounted to the rear of a tow vehicle. Still other objects are to provide a tow hitch assembly for insertion into a receiver at the rear of a tow vehicle that is durable, strong, and capable of use in the pulling of heavy trailer loads.

FEATURES OF THE INVENTION

Principal features of the invention include an insert having one end that will telescope into a standard or conventional receiver, affixed to the rear end of a tow vehicle. The insert includes a pair of spaced apart arms having an end plate affixed across the spaced arms at one end of the insert. The plate will telescope into the receiver, mounted on a vehicle, and will prevent rotation or turning of the insert. The plate has an outside shape conforming to the shape of the receiver and is made slightly smaller in size than the bore the receiver.

Spaced apart slide plates have a slide block positioned between them with sufficient clearance to allow the slide plates to move with respect to the slide block. Opposite ends of the slide plates are interconnected by a ball receiving plate.

The slide block has a hole therethrough to allow a securement pin to be inserted through the sides of the receiver and through the slide block. The securement pin is held in place by a resilient spring retainer clip. Another hole, extending from an upper face through the slide block may be aligned with holes through the spaced apart slide plates so that a locking pin can be inserted through the sliding plates and the slide block when the slide block is properly aligned. A spring retainer pin through the end of the locking pin secures the pin in place to hold the slide arms with respect to the slide block.

Upon removal of the locking pin, the slide plates are able to move with respect to the slide block, until the end plate interconnecting the slide plates engages the slide block. If the locking pin is removed and the slide plates are pulled outwardly from the receiver until the end plate engages the slide block, the slide plates have limited pivotal movement. The pivotal movement of the slide plates allows a ball affixed to the ball plate to be moved in a plane to opposite sides of the center position of the locking plate and ball. Thus, if the ball is moved to be proximate to the vertical line through the socket carried by the tongue of a trailer the ball can be pivoted to be directly beneath the socket. Thereafter, forward movement of the towed vehicle will pull the trailer and an application of the towing vehicle brakes will allow the trailer to move towards the braked towed vehicle and to push the slide plates further into the receiver, until such time as the holes through the slide plates and the slide block are aligned. Insertion of the locking pin then joins the slide block to the slide plates and since the slide block is secured to the receiver, the slide plates cannot longer move relative to the slide block.

Additional objects and features of the invention will become apparent to a person skilled in the art to which the invention pertains from the following drawings, detailed description and claims.

DETAILED DESCRIPTION

Figure 1:
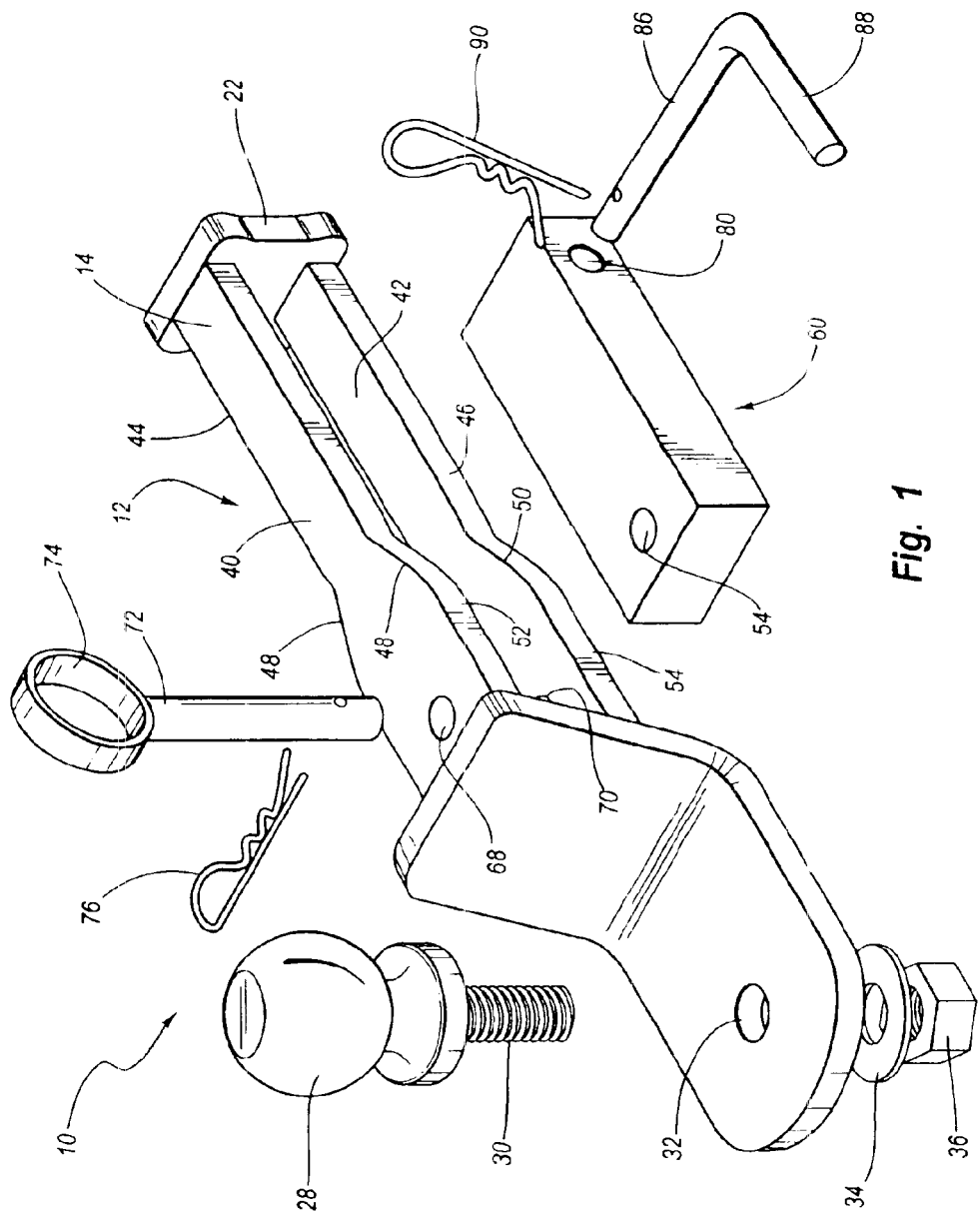
FIG. 1 is an exploded, perspective view showing the insert of the trailer hitch and a ball attached to said insert.
Figure 2:
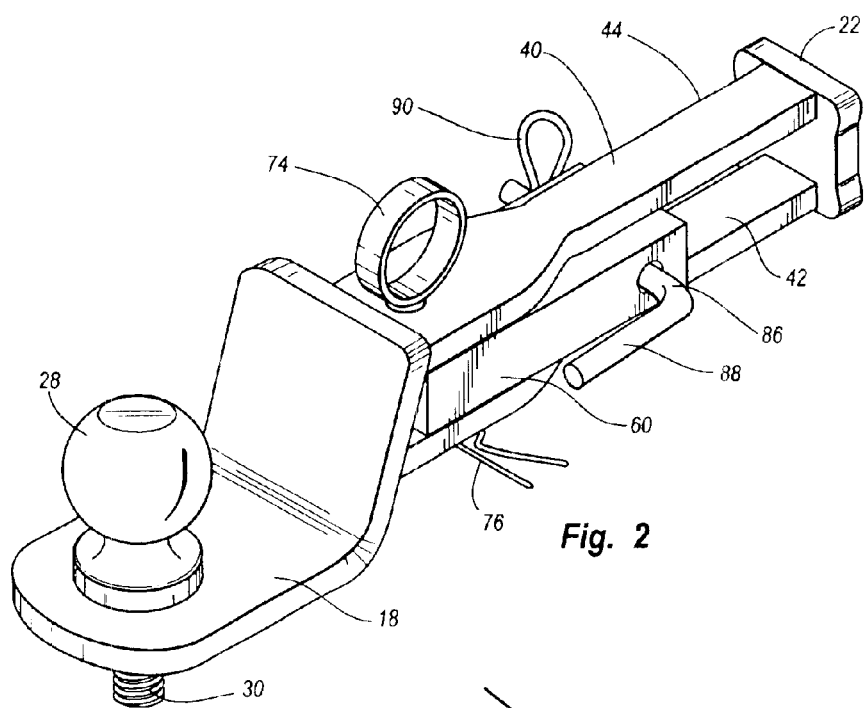
FIG. 2, a perspective view of the assembled insert component of the trailer hitch, with a ball mounted thereon.
Figure 3:
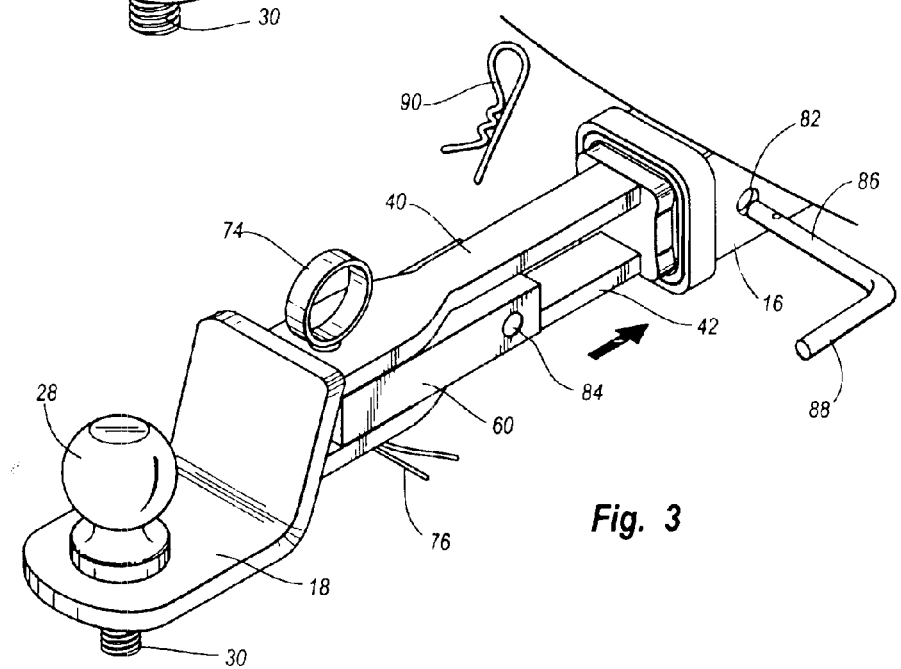
FIG. 3, a perspective view, partially exploded, showing a receiver attached to a vehicle and the insert assembly of the invention positioned to be inserted into the receiver and with a ball attached to the insert assembly.
Figure 4A:
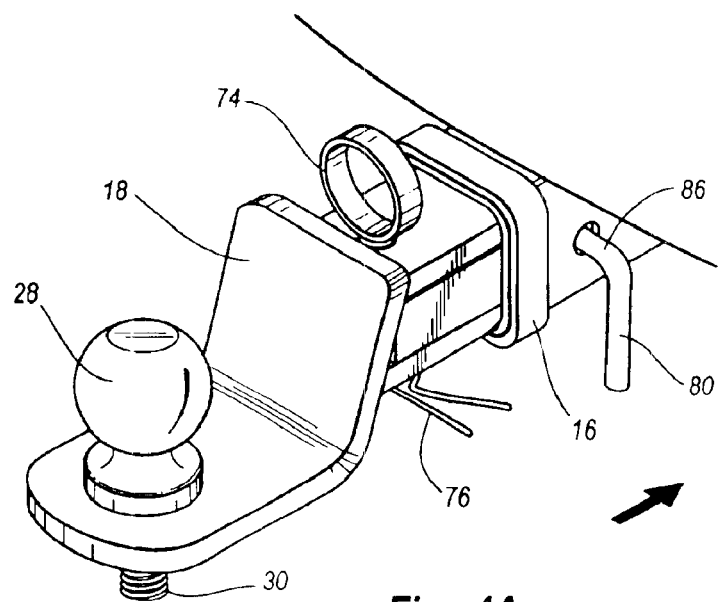
FIG. 4A, a prospective view like that of FIG. 3, but showing the insert assembly fully telescoped into the receiver, FIG. 4B, a perspective view like in FIG. 4A, but showing the insert assembly locked into the receiver and the slide plates and ball receiving plate pulled from the receiver.
Figure 4B:
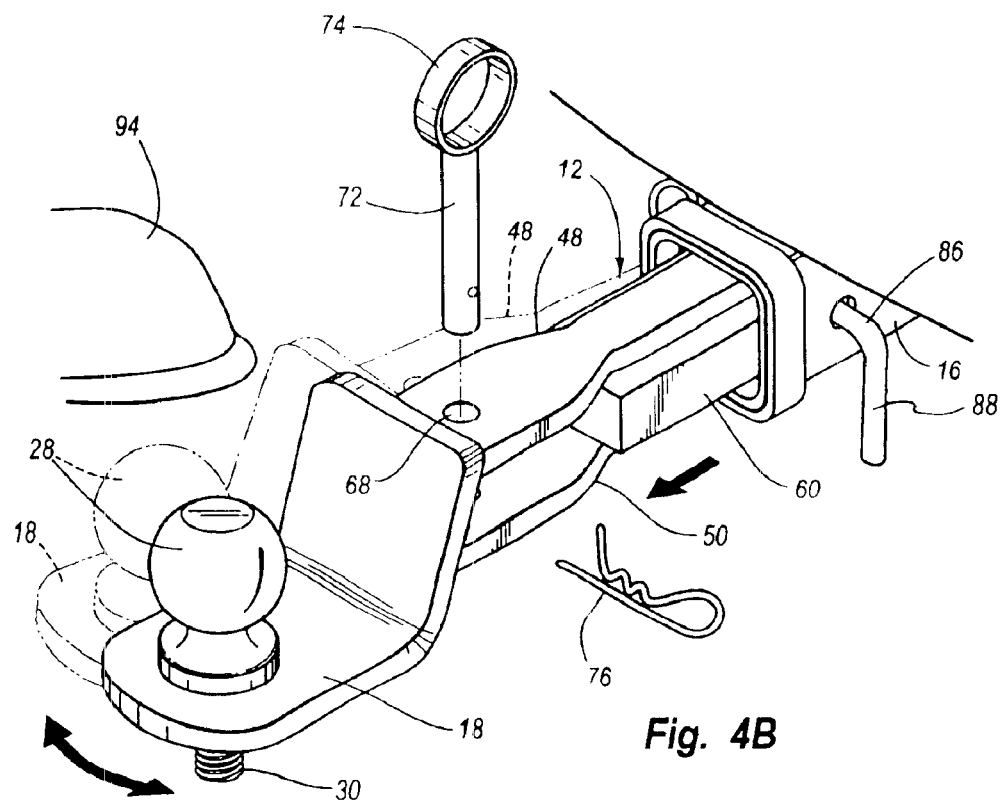
FIG. 4C, a view like that of FIG. 4A, but with the socket carried by the tongue of a trailer shown positioned over the ball.
Figure 4C:
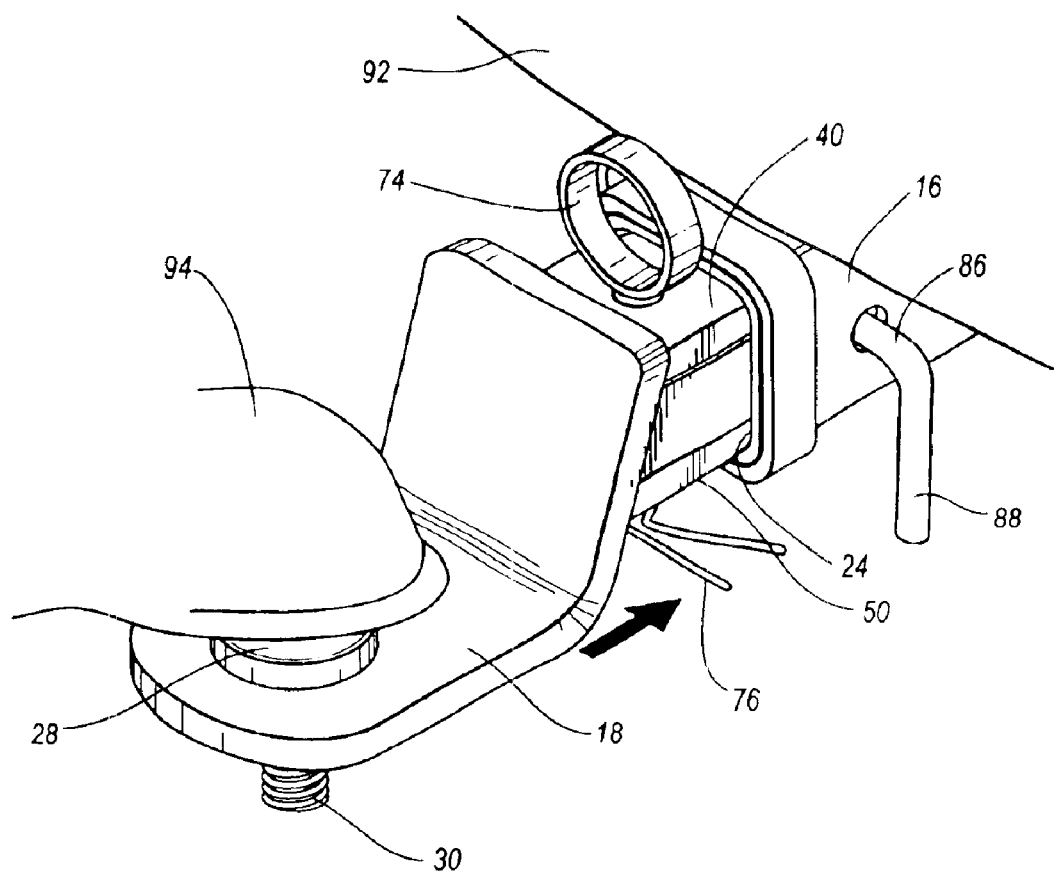
Figure 5A:
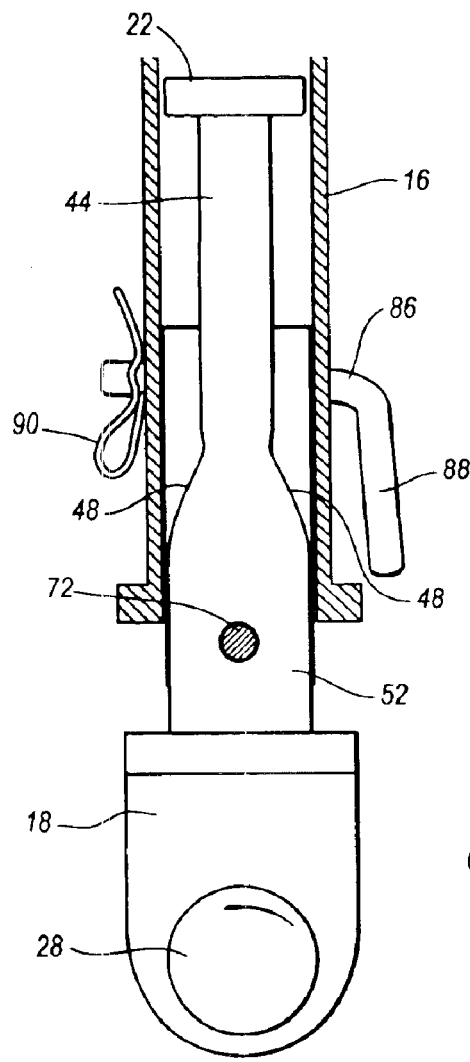
FIG. 5A, a central longitudinal section view, showing the slide plates secured to the slide block and the insert fully telescoped into the receiver.
Figure 5B:
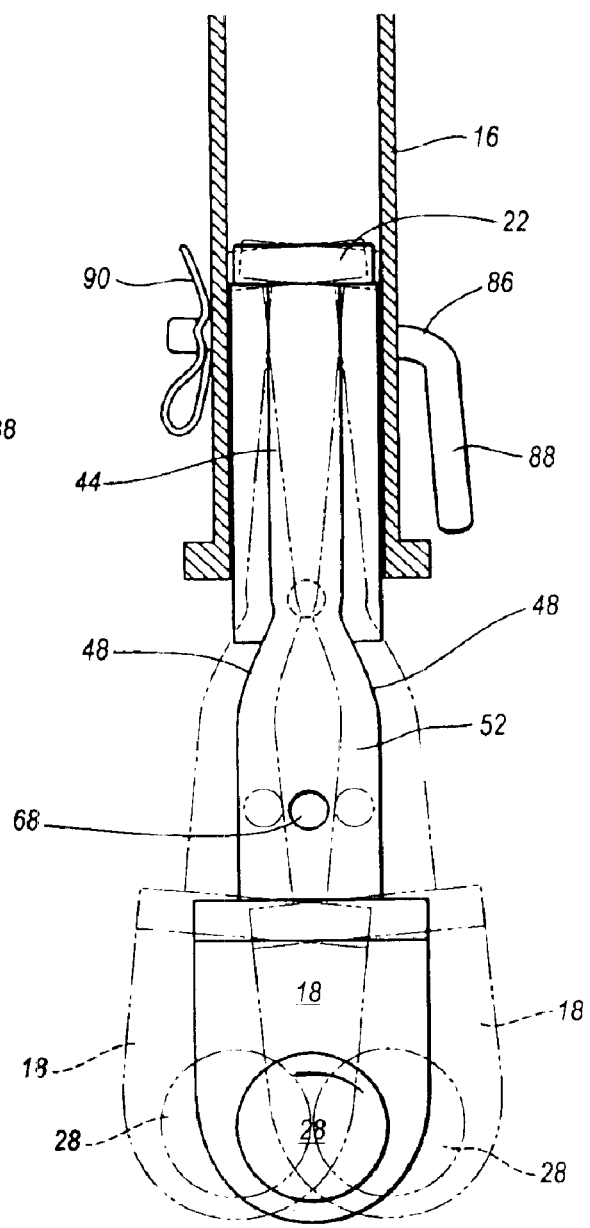
FIG. 5B, a section view like that of FIG. 5A, but showing the slide plates disconnected from the slide block and the insert assembly pulled forwardly within the receiver until contact is made between the end plate connected across the slide plates and the slide block, and with potential different positions of the ball receiving plate shown in phantom.

In the illustrated preferred embodiment, easy alignment trailer hitch is shown generally at 10.

The easy alignment trailer hitch includes an insert assembly 12 having an insert end 14 to be pushed into and pulled partially out of a receiver 16. A ball receiving plate is 18 fixed to an opposite end 20 of the insert assembly. The end 14 of insert assembly 12 has an end plate 22 thereon that will readily slide into and out of a bore 24 of the receiver 16 and that conforms to the shape of the base 24. Generally the bore 24 is of squire configuration.

A conventional ball 28 may be mounted to the ball receiving plate 18. A stem 30 of the ball is inserted through a hole 32 in the ball receiving plate 18 and is secured with a lock washer 34 and a nut 36.

Insert assembly 12 thus includes a pair of spaced apart slide plates 40 and 42, with the end plate 22 connecting the slide plates at one end of the insert assembly. The ball receiving plate 18 connects the opposite ends of the slide plates 40 and 42 at end 20 of the insert assembly 12.

Each slide plate 40 and 42 has a narrowed portion 44 and 46, respectively, adjacent to end 14 of the slide assembly. Curved shoulders 48 and 50 are respectively provided between the narrowed portions 44 and 46 and wider portions 52 and 54 of the slide plates 40 and 42, respectively, that are adjacent the end 14.

A central slide block 60 fits between the slide plates 40 and 42. Slide block 60 is made to fit snugly between the slide plates 40 and 42. The central slide block 60 has a width corresponding to the wider portions 52 and 54 of the slide plates and a length that will extend from the ball support plate to beyond the shoulders 48 and 50.

A hole 66 through the slide block 60 is aligned with holes 68 and 70 through the ends of the spaced apart slide plates 40 and 42 adjacent to the ball receiving plate 18. The holes 68, 66 and 70, when aligned, will receive a locking pin 72 having a pull ring 74 on one end and a spring retainer pin 76 removably inserted through the other end.

Another hole 80 through the opposite end of slide block 60 will align with holes 82 and 84 through receiver 16 and, when aligned, will receive a securement pin 86 therethrough. Securement pin 86 has a handle 88 on one end and a resilient spring retainer clip 90 inserted through a hole 92 at the other end of the retainer pin to keep the lock pin in place.

In use, the slide block 60 is positioned between the slide plates and is secured to the slide plates 40 and 42 by the locking pin 72. The locking pin 72 is secured in place by a spring retainer clip 76. The end 14 of insert 12 is telescoped into receiver 16 until the hole 80, 82 and 84 are aligned. The securement pin 86 is inserted to secure the slide block to the sidewalls of the receiver 16. The insert assembly 12 is fully telescoped into the receiver 16 and securement pin 72 is inserted through hole 68 and 70 of the slide plates and the hole 66 of the slide block 60. Securement pin 86 is inserted through the sidewalls 82 and 84 of the receiver and through the hole 80 to secure the locking block to the receiver.

Resilient spring retainer clip 90 is used to hold pin 86 in place. The insert assembly 20 is fully telescoped into receiver 16 until holes 68 and 70 through the slide plates are aligned with hole 66 in slide block 60. Locking pin 72 is inserted through the hole 68, 66 and 70 and is held in place by spring retainer pin 76. The ball 28 is attached to the ball receiving plate 18 with the washer 34 and nut 36 and the hitch 10 is ready to receive a socket mounted on the tongue end of a trailer.

If, during hookup of the hitch 10 to the trailer, the ball 28 is not positioned directly beneath the socket, the ball may be moved to facilitate such alignment. Removal of pin 72 allows the slide plates to come out of the receiver 16 until such time as the end plate 22 contacts the slide block 60, which is secured to the sidewall of the receiver by securement pin 86. Once the slide plates have been moved out sufficiently, the narrow portions of the slide plates and the shoulders 48 and 50 allow the slide plates to pivot in a plane of an arc determined by the amount of movement permitted between the end plate 22 engagement of the walls of receiver 16 and the shoulders 48 and 50 with the outermost edge of the receiver 16.

Once the insert assembly 12 has been pulled sufficiently far out of the receiver and the ball has been moved beneath a socket on the tongue of a trailer, the socket may be lowered onto the ball. Thereafter, the operator drives the towing vehicle forward and the trailer follows. At a location where it is safe to do so, the driver of the towing vehicle applies the brakes and the weight of the trailer continuing to move forward drives the insert assembly fully into the receiver 16. The securement pin 72 can then be inserted through holes 68, 66, and 70 to lock the slide plates of the receiver 16 to the slide block 60. The wide portions of the slide plates then extend into the entrance to the bore of the receiver and the width of the enlarged portions, being just smaller than the width of the receiver bore. With the insert locked into the receiver, the assembly is then ready to pull the trailer in the same manner as accomplished with the usual trailer hitch that includes a receiver and an insert member.

Although a preferred form of my invention has been herein disclosed, it is to be understood that the present disclosure is by way of example and that variations are possible without departing from the subject matter coming within the scope of the following claims, which subject matter I regard as my invention.

I claim:

1. An easy alignment trailer hitch comprising
   a receiver for attachment to a tow vehicle, said receiver having a bore there into, spaced apart sidewalls and aligned holes through sidewalls;
   an insert assembly including spaced apart slide plates, an end plate connecting said slide plates at one end of said insert assembly, a ball receiving plate interconnecting the other ends of the slide plates, a slide block positioned between said slide plates, means for securing said slide block to said retainer when said insert assembly is inserted into said receiver;
   means releasably connecting said slide plates to said slide block when said slide plates are fully inserted into said receiver, at least a portion of the slide plates having a narrowed width that is less than the width of the bore of the receiver; and
   a ball secured to said ball receiving plate.

2. An easy alignment trailer hitch as in claim 1, wherein the means for securing the slide block to the receiver is a securement pin inserted through aligned holes in the receiver and slide block when the insert assembly is inserted into the receiver.

3. An easy alignment trailer hitch as in claim 2, wherein the means releasably connecting the slide plates to the slide block includes a locking pin inserted through aligned holes in the slide plates and the slide block when said slide plates are fully inserted into said receiver.

4. An easy aligned trailer hitch as in claim 3, wherein the slide block has a width to fit closely into the bore of the receiver.

5. An easy alignment trailer hitch as in claim 4, wherein the narrowed portions of the lengths of the slide plates extend to the end of the slide block where the insert assembly is fully withdrawn from the receiver to shoulder connected to wider portions of said slide plates that fit closely into the bore of the receiver.

6. An easy alignment trailer hitch as in claim 5, wherein the shoulders are curved.

7. An insert assembly for an easy alignment trailer hitch comprising
a pair of spaced apart slide plates each connected at one end to an end plate and at the other end to a ball receiving plate;
a slide block between said slide plates;
means connecting said slide block to a hitch receiver carried by a tow vehicle; and
means to releasably lock said slide plates and said slide block together when said ball receiving plate is moved to be adjacent to said slide block.

8. An insert assembly as in claim 7, wherein at least portions of the lengths of the slide plates are narrower at the ends of the slide plates having the end plate connected thereto and are wider adjacent the ends having the ball receiving plates secured thereto and with shoulders interconnecting said narrower and said wider portions of the slide plates.

9. An insert as claim 8, wherein the shoulders are curved.

* * * * *